United States Patent [19]
Carrington et al.

[11] 3,871,084
[45] Mar. 18, 1975

[54] DEER SKINNING APPARATUS AND METHOD OF USING SAME

[76] Inventors: Henry A. Carrington, 415 Gettysburg Rd., San Antonia, Tex. 78228; Robert O. Kruse, 8111 Glenscot, Houston, Tex. 77017

[22] Filed: Oct. 12, 1973

[21] Appl. No.: 405,885

[52] U.S. Cl. ..................................................... 17/21
[51] Int. Cl............................................. A22b 5/16
[58] Field of Search................................. 17/21, 23

[56] References Cited
UNITED STATES PATENTS
3,209,395  10/1965  Jones et al............................ 17/21

*Primary Examiner*—Robert Peshock
*Attorney, Agent, or Firm*—Richards Harris & Medlock

[57] ABSTRACT

The specification discloses a device for skinning game animals such as deer. The device includes a flexible rope connected at one end to a loop support member and extending through an aperture in the support member to form a loop. The neck skin of a deer is cut and a portion peeled back to expose a flap of skin. An anchor block is wrapped within the flap of skin and the rope loop is disposed about the flap of skin and tightened. The anchor block prevents the flap of skin from being withdrawn from the loop. A stop clip is then positioned on the rope to prevent the rope loop from being loosened. The opposite end of the rope is then attached to a vehicle or the like and a force is applied to the rope in order to pull the skin from the animal.

6 Claims, 6 Drawing Figures

PATENTED MAR 18 1975
3,871,084
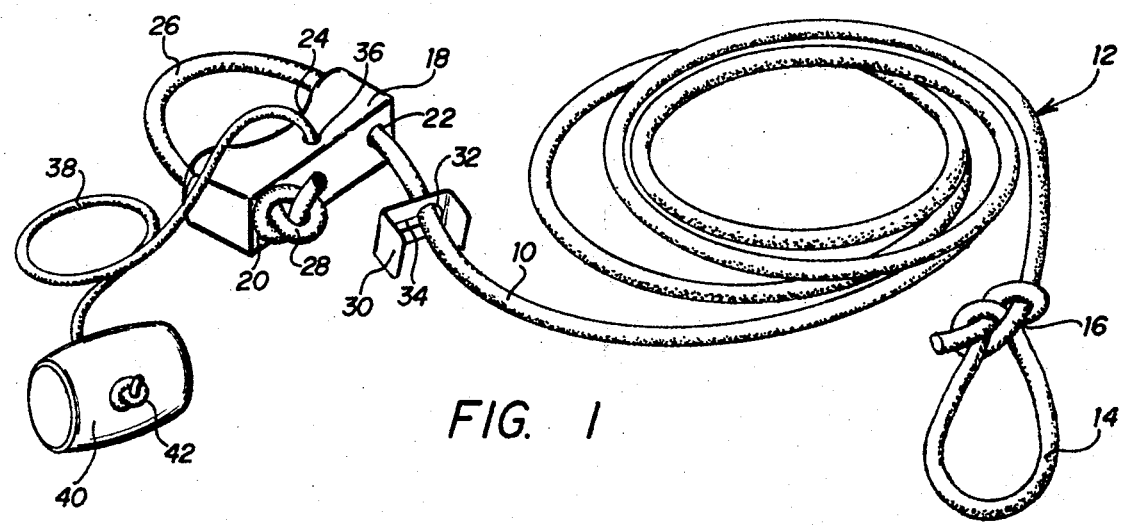
FIG. 1
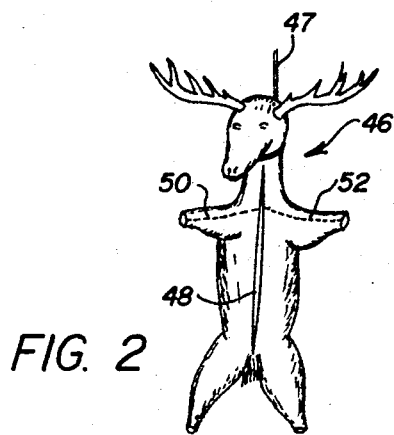
FIG. 2
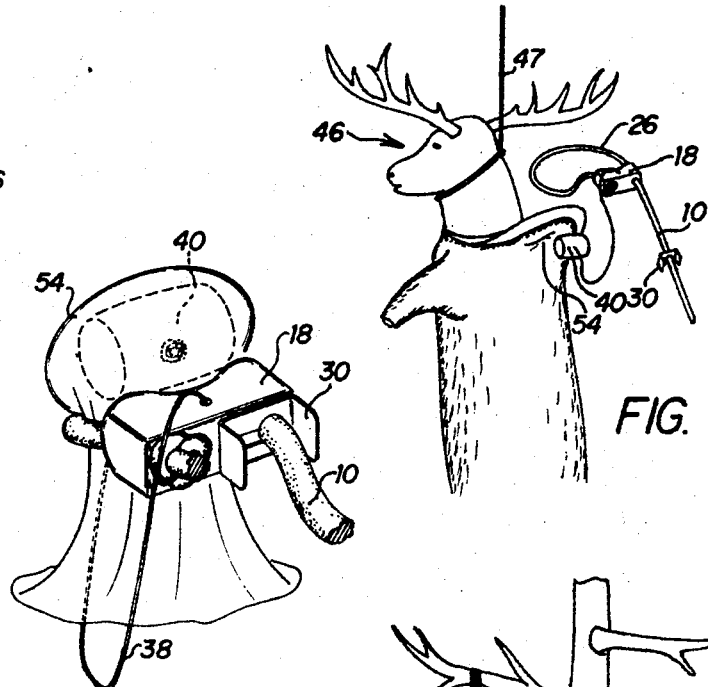
FIG. 4
FIG. 3
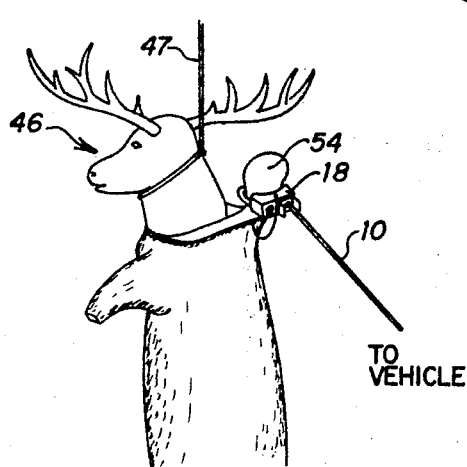
TO VEHICLE
FIG. 5
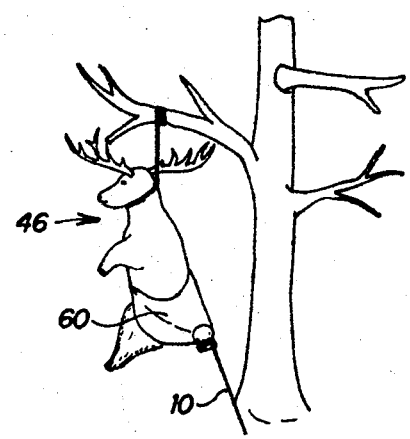
FIG. 6

DEER SKINNING APPARATUS AND METHOD OF USING SAME

FIELD OF THE INVENTION

This application relates to a method and apparatus for skinning a game animal, and more particularly relates to a method and apparatus for removing the skin from a deer carcass in an efficient manner.

THE PRIOR ART

A number of techniques have long been used to remove the skin from game animals such as deer. One common prior technique includes hanging a deer by the hind legs, cutting around portions of the skin and then manually pulling the skin from the carcass. However, manual removal of the skin often requires continuous cutting of the skin from the carcass and often requires several men. A need has thus arisen for a simple and efficient technique to enable the skin of a game animal to be removed in the field.

A number of systems have also been heretofore developed for skinning animals such as cattle, wherein the skin is gripped by a mechanical gripper and force is applied from a wench or the like through a chain or rope to the gripper in order to remove the skin. However, such prior systems are not practical for use by hunters in the field, due to the large size and complexity of the systems. Furthermore, such previously developed skinning systems have often not been completely satisfactory in operation, in that the gripper has sometimes tended to slip from the skin during skinning of the carcass.

SUMMARY OF THE INVENTION

The present invention provides a deer skinning apparatus and method which substantially eliminates or reduces many of the problems heretofore associated with prior game animal skinning techniques. The present invention includes cutting the neck of the deer and peeling a portion of the cut rear neck skin to expose a flap of skin. A rigid anchor block is inserted within a pouch formed from the flap of skin and a loop of a flexible member is disposed about the pouch and tightened. The anchor block prevents withdrawal of the pouch from the loop. A pull is exerted on the end of the flexible member to pull the skin from the carcass.

In accordance with a more specific aspect of the invention, the present invention includes a device for skinning a game animal including an elongated flexible member, with a loop support member connected to a first end of the flexible member to enable a loop of the flexible member to be formed. The loop is then disposed about a flap of skin on the neck of the animal. An anchor block is wrapped within the flap of skin to prevent the flap of skin from being withdrawn from the loop of the flexible member. The loop is tightened about the flap of skin and the enclosed anchor block and a force is then exerted on the second end of the flexible member to pull the skin from the animal. A clip is provided on the flexible member to prevent loosening of the loop of the flexible member from the support member.

DESCRIPTION OF THE DRAWINGS

For a more detailed description of the present invention and for other objects and advantages thereof, reference is now made to the following description, taken in conjunction with the accompanying drawings, in which:

FIG. 1 is a perspective view of the preferred embodiment of the present deer skinning apparatus;

FIG. 2 is a somewhat diagrammatic view of a deer prepared for skinning according to the present method;

FIG. 3 is a somewhat diagrammatic view illustrating the initial attachment of the device shown in FIG. 1 to a neck skin flap of the deer;

FIG. 4 is an enlarged view illustrating tightening of the present device about the flap of neck skin of the deer; and FIG. 5 and FIG. 6 illustrate various stages in the skinning of the deer after attaching the present device to a vehicle.

DESCRIPTION OF THE PREFERRED EMBODIMENT

FIG. 1 illustrates a coiled length of an elongated flexible member 10 which may comprise for example a rope made from a plastic material such as nylon or polypropylene, or which may be alternatively made of hemp or other conventional material. The length of the flexible member or rope 10 may be varied for different applications, but in the preferred embodiment, the rope 10 is approximately 7 to 8 feet long and has a diameter of approximately ¼ inch. When not in use, the rope 10 will generally be maintained in a coiled position as generally represented by the numeral 12. One end of the rope 10 is formed in a permanent loop 14 by a knot 16 in order to enable attachment to a vehicle in the manner to be subsequently described.

A loop support member 18 is preferably comprised of a rigid material such as metal or plastic and includes a pair of spaced apart apertures 20 and 22 extending therethrough. An inwardly curved surface 24 is defined on one side of the member 18 between the apertures 20 and 22 in order to better accommodate a flap of deer skin in the manner to be subsequently shown. The rope 10 is threaded through both of the apertures 20 and 22 in order to form an adjustable loop 26. The end of the rope 10 is tied in a knot 28 on the side of support member 18 opposite loop 26 in order to prevent the removal of the rope from aperture 20. The rope 10 is freely movable through aperture 22 in order that the size of the loop 26 may be easily adjustable.

A stop clip 30 comprises a metal or plastic piece having a generally U-shaped cross section and including an aperture therethrough. The aperture includes an enlarged portion 32 which normally receives the rope 10 and allows the stop clip 10 to be freely movable along the length of the rope 10. The aperture through clip 10 also includes a narrow portion 34 which may tightly receive the rope 10 in order to prevent relative movement between the clip 30 and the rope 10 to prevent enlargement of the loop 26.

The loop support member 18 also includes an aperture 36 therethrough which receives one end of a flexible member 38 which may comprise for example a nylon string or the like. The other end of the string 38 is passed through an aperture of an anchor block 40 and is tied in a knot 42 to maintain the anchor block 40 in the region of the support member 18. Normally, a second knot (not shown) will be tied on the opposite side of the anchor block 40 in order to maintain the anchor block 40 at the end of the string 38. Anchor block 40 may comprise any suitable rigid material such as wood or plastic and is generally provided with rounded edges in order to better receive a flap of skin in the manner to be subsequently described.

FIGS. 2 – 6 illustrate the operation of the apparatus shown in FIG. 1 in order to skin a game animal such as a deer. FIG. 2 illustrates the initial steps of preparation of the deer carcass 46. Carcass 46 is initially hung from a rigid support such as a tree, by a rope or chain 47. The deer is conventionally field dressed and the body cavity of the carcass is split lengthwise by a cut 48 from the carcass anus to high in the neck under the jaw of the carcass. The legs of the carcass are then removed at the elbow joint, as shown, and splits 50 and 52 are made in the forelegs of the carcass from the cut 48 to the elbow joints.

FIG. 3 illustrates the subsequent steps of processing the carcass 46 by cutting the neck skin of the carcass behind the head and extending to the inside surface of the neck. The neck skin is then peeled downwardly approximately 8–12 inches in order to form a loose flap 54 of skin. The anchor block 40 is then inserted as shown in FIG. 3 against the exterior of the skin flap 54 and the skin is pulled over the anchor block 40 to form a skin pouch whose upper edge is no closer than approximately 2 inches from the surface of the neck hide of the carcass. The adjustable loop 26 is then disposed over the skin flap 54 and the anchor block 40, and the rope 10 is pulled through the aperture 22 in the support member 18 in order to tighten the loop 26 and member 18 about the skin flap.

FIG. 4 illustrates the position of the present device when the loop 26 has been tightened about the skin pouch formed by the skin flap 54 and the anchor block 40. At this time, the stop clip 30 is moved adjacent the loop support member 18 and the clip is moved so that the narrow aperture 34 tightly receives the rope 10 in order to prevent loosening of the loop 26. At this time, the end of the rope 10 is thus firmly attached to the upper portion of the skin of the carcass.

Referring to FIG. 5, the free end of the rope 10 is then tied securely to the bumper or other portion of a vehicle. Alternatively, a manual pull may be applied to the rope 10, but the use of the vehicle is preferred. Steady pressure is applied from the vehicle to the rope 10 and, as shown in FIG. 6, the skin or hide 60 is pulled cleanly away from the carcass 46. With the use of the present device, it has been found that the rope 10 does not tend to slip off of the skin and the skinning of the deer may thus be accomplished quickly and efficiently. The skinned carcass 46 is now ready for further processing or storage in a game bag or the like.

The present system may be folded into a very compact configuration and is thus easy to carry in the field when hunting. All the pieces of the device are interconnected and are easy to attach to the hide of a game animal when skinning. The device may be easily attached to a vehicle or the like in order to enable the skin of the carcass to be removed without requirement of manual labor. The components of the device are made from plastic, metal and other materials which are easily cleaned after use.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. An apparatus for removing the skin from an animal comprising:
   an elongate flexible member;
   a rigid anchor block having rounded edges has such shape and dimensions that a pouch may be formed from the skin of an animal by folding over said block;
   a rigid loop support member having first and second aperatures spaced apart by a curved cradle surface a first end portion of said flexible member extending through said apertures to enable a loop of said flexible member to be formed of such a size and shape for initially being disposed over the pouch of skin formed around said block and then tightened such that said block may not pass through the loop, whereby a force may be exerted on the second end of said flexible member to pull the skin from the animal; and
   means for coupling said anchor block to said loop support member.

2. The apparatus for skinning a game animal of claim 1 and further comprising:
   clip means for preventing loosening of said loop of said flexible member from said support member.

3. The apparatus for skinning a game animal of claim 2 wherein said clip means includes an aperture having an enlarged portion to enable free movement of said flexible member therethrough and a narrow portion for clamping to said flexible member, said clip means mounted on said flexible member on the side of said support member opposite said loop of said flexible member.

4. The apparatus for skinning a game animal of claim 1 and further comprising:
   a stop clip having a first position for being freely movable along said flexible member and a second position for being firmly attached to said flexible member to prevent enlargement of said loop.

5. The apparatus for skinning a game animal of claim 1 wherein said flexible member comprises a plastic rope.

6. The apparatus for skinning a game animal of claim 1 and further comprising a second loop formed in the second end of said flexible member to enable connection to a vehicle.

* * * * *

UNITED STATES PATENT OFFICE
CERTIFICATE OF CORRECTION

Patent No. 3,871,084          Dated March 18th, 1975

Inventor(s) HENRY A. CARRINGTON et al

It is certified that error appears in the above-identified patent and that said Letters Patent are hereby corrected as shown below:

Column 4, line 15 delete "has" and insert --and having--.

Signed and Sealed this fourth Day of November 1975

[SEAL]

Attest:

RUTH C. MASON
Attesting Officer

C. MARSHALL DANN
Commissioner of Patents and Trademarks